United States Patent Office

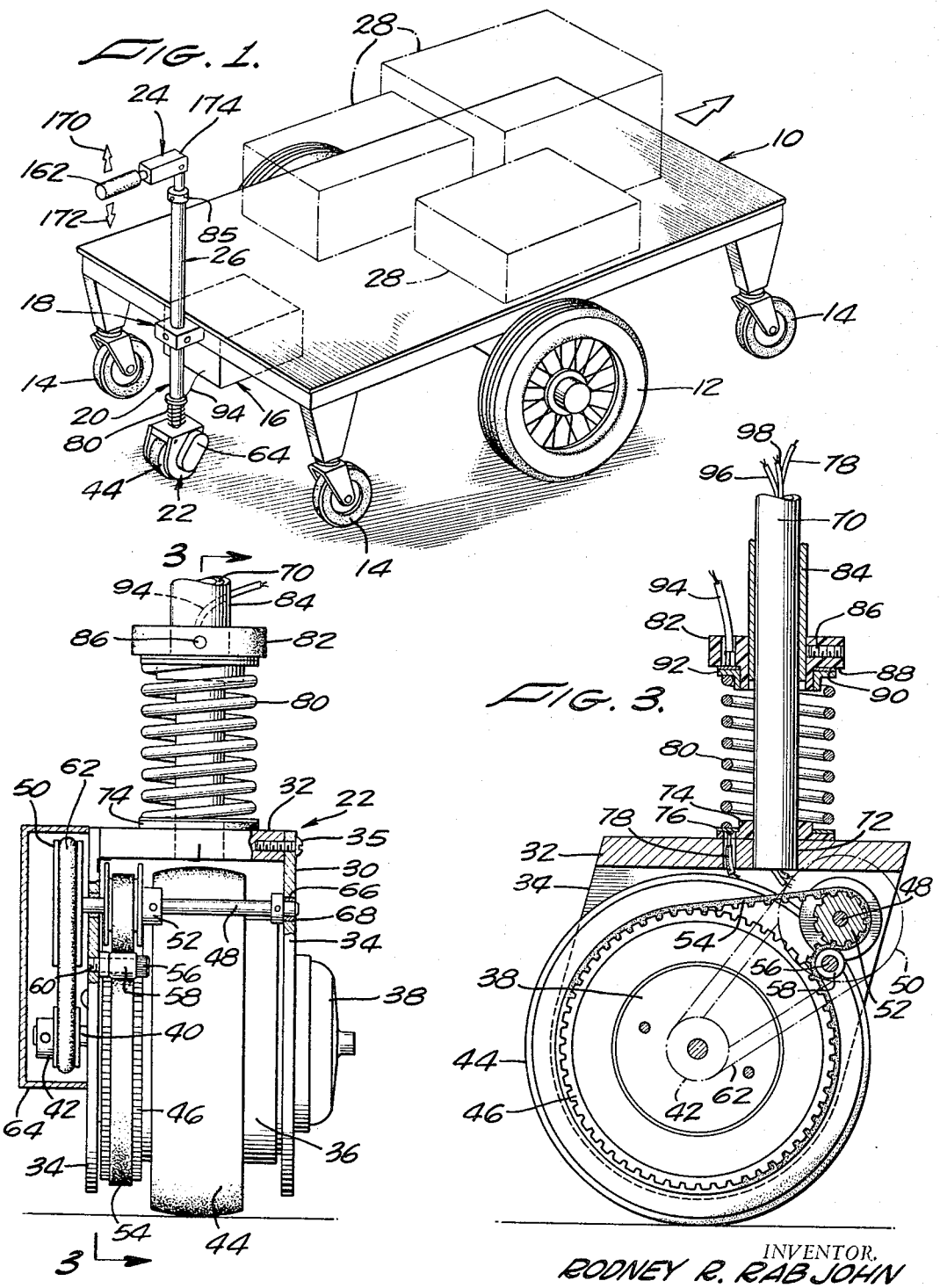

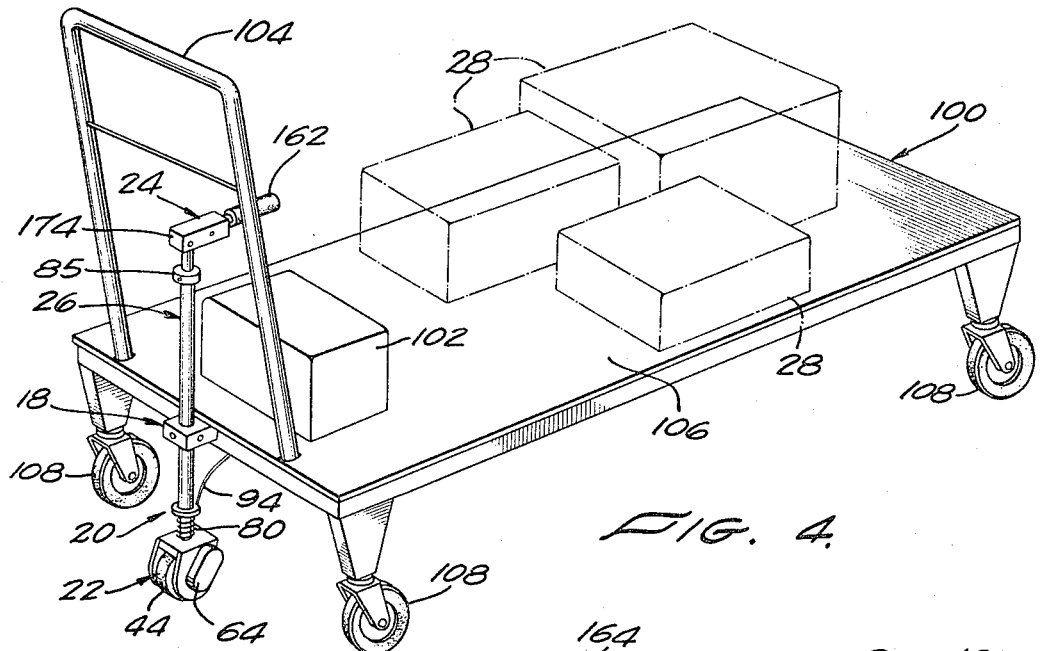
FIG. 4.
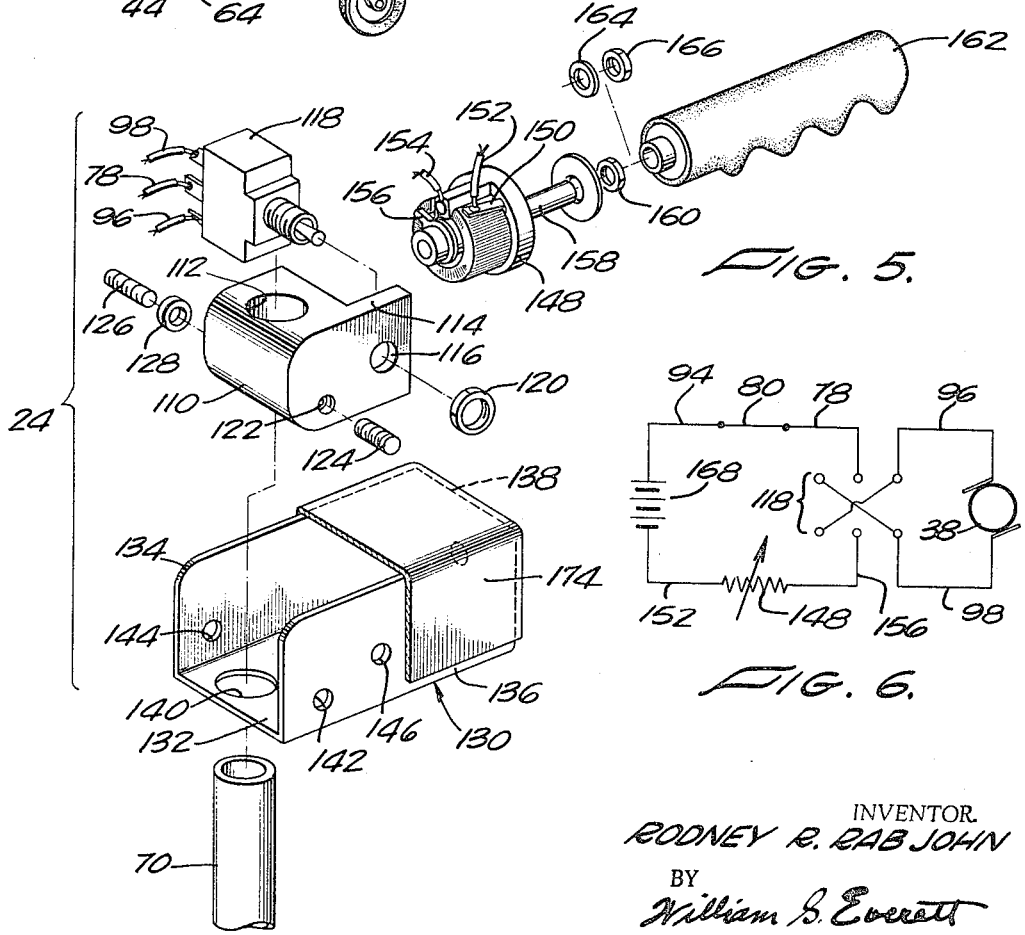
FIG. 5.
FIG. 6.
INVENTOR.
RODNEY R. RABJOHN
BY
William S. Everett
AGENT

3,380,546
Patented Apr. 30, 1968

1

3,380,546
TRACTION DRIVE FOR SMALL VEHICLES
Rodney R. Rabjohn, 9850 Stanwin Ave.,
Pacoima, Calif. 91331
Filed Feb. 14, 1966, Ser. No. 527,294
5 Claims. (Cl. 180—15)

ABSTRACT OF THE DISCLOSURE

This invention provides a compact, steerable motor drive for small vehicles having a control operable either from a walking position behind the vehicle or from a riding position on the vehicle. A control assembly is provided, up and down movement of the handle determining the direction of motion, rotation of the handle about its longitudinal axis serving to vary the speed or rate of said motion, and angular displacement of the handle about the vertical axis resulting in steering control of the vehicle utilizing the invention. The traction drive of the invention may be attached as a fifth, or more, wheel to an existing vehicle, or any one or all of the wheels of a vehicle may be replaced with a like number of traction drives.

---

This invention relates to small vehicles of the type used in warehouses and the like and more particularly to a traction drive for such vehicles to connect them for powered operation.

In virtually every business or activity some sort of small vehicle may be found being used to lessen man's labors and to improve or increase his productivity. Many of these vehicles are sufficiently large enough to justify some sort of engine or motor and associated machinery. But, in these cases, the investment required not infrequently prevents their procurement. Of those vehicles not sufficiently large enough, an economically feasible power device was unavailable until the traction drive to be described was invented, developed, and tested. Conceivably, the present invention can be provided in a range of sizes, from a miniaturized model to one exceeding the moderately sized gasoline operated industrial carts, dollys, etc. The present invention is in no way limited to vehicles not having provisions for transporting the operator. Furthermore, the invention to be described may be applied at each wheel of the vehicle regardless of its type. The result is a novel traction drive for small vehicles which is characteristically compact, powerful and reliable, and inexpensive to manufacture and maintain in service.

According to one aspect of the invention, there is provided a traction drive for small vehicles comprising in combination support column means including bracket means for mechanically coupling the traction drive to the vehicle; motor means operatively disposed on the support column means at the lower end thereof and including a traction wheel in force transmitting relationship with the surface supporting the vehicle; control means operatively disposed on the support column means at the upper end thereof and including means for controlling the operation of the motor means and the vehicle; a source of electrical power for the motor means; and means for providing a conductive path between the power source and the motor means, the control means being adapted to vary the impedance characteristics and to determine the direction current is to flow from the power source to the motor means in response to the manipulation of the control means.

It is therefore the primary objective and purpose of the invention to provide a traction device for small vehicles and the like.

2

It is another object of the invention to provide a compact, powerful and inexpensive traction device for industrial type vehicles.

It is still another object of the invention to provide a traction device of the type described that is capable of forward and reverse operation.

It is yet another object of the invention to provide a traction device of the type described that is operable in all directions of the compass without interrupting the power flow to the motor.

It is still another object of the invention to provide a traction device of the type described which may be quickly clamped to industrial vehicles for power operation of same.

Another object of the invention is to provide a traction device of the type described which can be substituted for each wheel of a vehicle for multiple powered operation when required.

Still another object of the invention is to provide a traction device of the type described which is compact in design, reliable in operation and inexpensive in manufacture and yet readily susceptible to variations in power transmissions to provide the most useful and efficient power ranges to perform the function assigned.

Yet another object of the invention is to provide a traction device of the type described having its own self-contained power pack for remote operational purposes, the entire package being readily transportable by all types of carriers including air.

These and other objects, features and advantages of the invention will appear and be brought out more fully in the following specification reference being had to the accompanying drawing wherein:

FIGURE 1 is a perspective view of a traction drive operatively mounted on a small vehicle in accordance with the invention and having its associated power source carried along the underside of the vehicle.

FIGURE 2 is an end view partially in cross-section of the motor means portion of the invention as shown in FIGURE 1.

FIGURE 3 is a partial cross-sectional view of the motor means portion of the invention taken along the line 3—3 of FIGURE 2.

FIGURE 4 is a perspective view of the traction device according to the invention operatively mounted on a different type of industrial cart, one in which the operator is also transported and in which the power source is carried on the cart and forms a seat for the operator.

FIGURE 5 is an exploded perspective view of the control means portion of the invention for purposes of description.

FIGURE 6 is a simplified electrical schematic diagram of the invention.

Referring now to FIGURE 1 of the drawing, shown there in perspective is a small industrial cart or vehicle 10 having two relatively large main wheels 12 and small swivel type auxiliary wheels 14 disposed at each corner of the cart. The vehicle 10 has provisions for receiving a power pack 16 containing a conventional storage battery of suitable voltage and for attaching, by means of a conventional bracket 18, a traction unit 20 according to the invention. The bracket 18 may comprise a clamp, not shown, which is permanently attached to the traction unit and which may be removably attached to the vehicle 10 in a manner similar to that shown in FIGURE 1 and 4.

The traction unit 20 comprises a motor means portion 22, a control means portion 24, and a support column means portion 26 to which the bracket means 18 is attached.

As best seen in FIGURES 2 and 3, the motor means portion 22 includes an inverted U-type housing 30 having a top plate 32 and two parallel side plates 34 extending downwardly from the top plate 32 and attached thereto by conventional fasteners 35. A cylindrical portion 36 is disposed between the side plates 34 and similarly held by conventional fasteners, not shown. If desired, the top plate 32 and the cylindrical portion 36 may be welded to the side plates 34. The cylindrical portions 36 may be centerless ground prior to installation for reasons set forth below.

A motor 38 is carried inside the cylindrical portion 36 with a motor shaft 40 extending through the left side plate 34, as in FIGURE 2. A drive pulley 42 is operatively mounted on the motor shaft 40.

A rubber tire 44 and a ring gear 46 may be mounted on the cylindrical portion 36 by means of a bearing, not shown, which may be any conventional roller bearing of appropriate diameter and width. By centerless grinding the cylindrical portion 36, the inner race of such a roller bearing may comprise the ground outer cylindrical surface of the portion 36.

A power transmitting shaft 48 having a driven pulley 50 in operative alignment with the drive pulley 42 extends between the side plates 34. In alignment with the ring gear 46 is a suitably matched driving gear 52 operatively mounted on the shaft 48. The gears 46 and 52 may have rectangularly shaped teeth to receive in force transmitting relationship a rubber belt 54 having matching tooth configurations. To maintain proper belt tension, an idler shaft 56 having an idler pulley 58 is provided and threadedly attached to the inside of the side plate 34 that is adjacent the belt 54 by means of a threaded opening 60.

The pulleys 42 and 50 are mechanically coupled together by means of a belt 62, the entire assembly being protected by a cover plate 64 secured to the housing 30 by conventional fasteners, not shown. Openings 66 are also provided in the side plates 34 for receiving bearings 68 which in turn receive the shaft 48.

Into an opening 72 extending vertically through the top plate 32 is fastened a tubular member 70. An insulating washer 74 having an annular surface for holding a conductive washer 76 to which a conductor 78 is electrically attached on its hidden surface is disposed around the member 70 and on the top plate 32. A coil spring 80 rests on the washer 76. A similar assembly comprising an insulating collar 82 secured to a stationary tubular member 84 by set screws 86 and having an annular bearing surface 88 with a conductive washer 90 disposed against the surface 88 by a spring guide element 92 in turn rests on the spring 80. A conductor 94 is electrically connected to the washer 92 which along with the member 84 remains stationary at all times.

It should be noted that when the member 70 is rotated, the housing 30 likewise is turned according and with it the insulating washer 74 and the conductive washer 76. Thus, the coil spring, which provides electrical continuity between the conductors 94 and 78, moves relatively in some fashion whenever the member 70 is rotated.

As seen in FIGURE 3, the conductor 78 extends through the top plate 32 and then upwardly through the member 70 along with the motor leads 96 and 98.

In FIGURE 4, there is shown another type of industrial vehicle 100 for moving merchandise represented by a reference numeral 28. In this embodiment, the traction unit 20 is similarly attached to the frame of the vehicle 100 except that the power pack or source 16 forms a seat 102 for the operator and the control means portion 24 is positioned oppositely to that shown in FIGURE 1. In FIGURE 4, the vehicle 100 is shown to include a protective railing 104 extending upwardly from a flat bed 106 which is supported at each of four corners by small caster-like wheel assemblies 108, certain ones of which may be locked in a predetermined direction for better directional control.

In FIGURE 5, the control means portion 24 of the invention is shown in exploded perspective to facilitate operational description thereof.

Attached to the upper end of the tubular member 70 is a body member 110 having an opening 112 into which the member 70 is inserted. An extension 114 having an opening 116 is provided on the body member 110 for receiving a switch 118 of the double-pole, double-throw type. A nut 120 may be used to secure the switch 118 to the body member 110, which also includes threaded openings 122 disposed along a line orthogonally disposed to the opening 112. Set screws 124 and 126 are provided for the openings 122 for reasons to be described.

A housing 130 having a bottom wall 132 with coextending upwardly directed side walls 134 and 136 interconnected by an end wall 138 is provided with an opening 140 through the bottom wall 132 for receiving the tubular member 70 in assembled disposition.

The set screws 124 and 126 pass partially through the openings 142 and 144 respectively provided in the corresponding side walls 136 and 134 and serve as an axis about which the end wall 138 can be moved up and down as shown in FIGURE 1 by the arrows 170 and 172 respectively. A spacer 128 may be used to provide adequate clearance for the conductors 78, 96, and 98.

An opening 146 is provided in the side wall 136 of the housing 130 for receiving the toggle of the switch 118. That portion of the toggle which extends beyond the outer surface of the side wall 130, when the control means portion is fully assembled, may be removed to provide suitable clearance for receiving a cover 174.

A variable resistance 148 which may be a conventional rheostat is supportedly carried in the end wall 138. The fixed terminal 152 may be connected to the negative or ground terminal of a battery 168 as shown in FIGURE 6. The other terminal 154 which is associated with the moving element 156 of the rheostat 148, as seen in FIGURES 5 and 6, may be electrically connected to one of the two movable contact terminals of the switch 118, the conductor 78 being connected ot the other.

The rheostat 148 includes a shaft 158 adapted to receive a nut 160 for attaching the rheostat 148 to the housing 130. A handle 162 may be threadedly attached by means of a nut and lock washer combination, 164 and 166, to the shaft 158.

With this arrangement, the motor means portion 22 of the traction unit 20 can be readily operated and controlled from either a walking position behind the vehicle 10 as seen in FIGURE 1 or from a riding position on the vehicle 100 as seen in FIGURE 4. In either case, up and down movement of the handle 162 actuates the switch 118 and, as best seen in FIGURE 5, changes the relative direction of current flow to the motor 38 from the battery 168. By rotation of the handle 162 about the shaft 158, the resistance can be changed accordingly and the current flow in turn varied to control the speed of the motor 38. By moving the handle 162 to the left or right, the tubular member 70 and hence the motor means portion 22 can be rotated or turned to a desired direction for steering the vehicles 10 and 100. It should be noted that the control means portion may be positioned at any angle relative to the motor means portion 22.

While I have herein shown and described my invention in what I have conceived to be the most practical and preferred embodiments, it is recognized that departures may be made therefrom within the scope of my invention, which is not to be limited to the details disclosed herein but is to be accorded the full scope of the claims so as to embrace any and all equivalent devices and methods.

I claim:

1. A traction drive for small vehicles comprising in combination:

support column means including bracket means for mechanically coupling said traction drive to said vehicle, said support column further including a rotatable tubular shaft disposed along a substantially vertical line;

motor means operatively disposed on said support column means at the lower end thereof and including a traction wheel in force transmitting relationship with the surface supporting said vehicle;

control means operatively disposed on said support column means at the upper end thereof and including a body member attached to said tubular shaft, a housing pivotably mounted on said body member and movable in up and down directions about a substantially horizontal line, switch means operatively mounted on said body member and responsive to said up and down movement for determining the direction of current flow through said motor means, handle means operatively mounted on said housing for imparting clockwise and counter-clockwise force to said rotatable shaft for controlling the direction of said vehicle, and means operatively disposed in said housing and coupled to said handle means for controlling the amount of said current flow and speed of said vehicle in response to clockwise and counter-clockwise movement of said handle means about a line substantially parallel to said surface and orthogonal to said vertical line;

a source of electrical power for said motor means; and means for providing a conductive path between said power source and said motor means, said control means being adapted to vary the impedance characteristics and to determine the direction current is to flow from said power source to said motor means in response to the manipulation of said control means.

2. The traction drive in accordance with claim 1 further characterized in that said motor means includes a permanent magnet type of direct current motor, an inverted U-shaped housing structure having side plates and openings in said side plates for operatively mounting said motor therein, a power transmitting shaft extending substantially horizontally from one side plate and through the other side plate forming a shaft extension, means operatively coupled to said shaft extension and to the shaft of said motor for transferring rotating motion from said motor shaft to said power transmitting shaft, means for transferring rotational motion fom said power transmitting shaft to said traction wheel, said traction wheel being operatively disposed around said motor and including a rubber tire in contact relationship with said supporting surface; and in that said power source comprises a storage battery for supplying power in a controlled direction and amount to said motor.

3. The traction drive in accordance with claim 2 further characterized in that said support column means includes an outer tubular support adapted to rotatably receive said tubular shaft; and circuit means including a coil spring electrically isolated from said support column means and said motor means for providing circuit continuity from said battery to said motor as said rotatable shaft is angularly displaced about said substantially vertical line, said bracket means being clamped to said outer tubular support and to said vehicle at the frame thereof.

4. The traction drive in accordance with claim 3 further characterized in that said conductive means includes an insulated conductor electrically connected to said circuit means at the lower end of said coil spring and extends through said housing and upwardly in said rotatable shaft and terminated at a movable contact of said switch means, separate poles of said switch means being electrically coupled by conductors to first and second terminals of said motor, said switch means including a second set of poles and another movable contact, both movable contacts being actuated simultaneously with opposite poles thereof being interconnected; and in that said conductive means further includes variable resistance means having a first terminal electromagnetically coupled to said other movable contact and a second movable terminal electromagnetically coupled to said vehicle through said housing, said rotatable shaft, said outer tubular support and said bracket means to the frame of said vehicle.

5. The combination of a vehicle and the traction drive in accordance with claim 4.

References Cited

UNITED STATES PATENTS

| | | | |
|---|---|---|---|
| 2,417,613 | 3/1947 | Radabaugh | 180—19 |
| 2,815,083 | 12/1957 | Ellingsworth | 180—65 X |
| 3,023,825 | 3/1962 | Rabjohn | 180—15 |
| 3,225,853 | 12/1965 | Norton et al. | 180—65 X |
| 3,289,780 | 12/1966 | Ferris | 180—65 X |

KENNETH H. BETTS, *Primary Examiner.*